3,369,045
3,3' - BIS(α,γ - DIHYDROXY - β,β - DIMETHYL-
BUTYRYLAMINO)-DIPROPYL ETHER
Gustav Erlemann, Riehen, and Otto Schnider, Basel,
Switzerland, assignors to Hoffmann-La Roche Inc.,
Nutley, N.J., a corporation of New Jersey
No Drawing. Filed Sept. 11, 1964, Ser. No. 395,921
Claims priority, application Switzerland, Oct. 9, 1963,
12,390/63
2 Claims. (Cl. 260—561)

ABSTRACT OF THE DISCLOSURE

There is described 3,3'-bis(α,γ-dihydroxy-β,β-dimethyl-butyrylamino)-dipropyl ether, particularly, D(+)-3,3'-bis(α,γ - dihydroxy-β,β-dimethylbutyrylamino) - dipropyl ether and the production thereof.

The compounds are useful as an active component in cosmetic preparations.

---

The present invention relates to a novel ether and to its production and use. More particularly, the invention relates to a novel ether of panthenol, to a process for its production and to cosmetic preparations containing same.

The novel ether of this invention is 3,3'-bis(α,γ-dihydroxy-β,β - dimethylbutyrylamino) - dipropyl ether. This compound is useful as an active component in cosmetic preparations.

The novel 3,3'-bis(α,γ-dihydroxy-β,β-dimethylbutyrylamino)-dipropyl ether of this invention is readily produced. In general, the preparative method comprises the reaction of racemic or optically active α-hydroxy-β,β-dimethyl-γ-butyrolactone with di(3-aminopropyl)ether.

The reaction which is involved in the process of this invention is effected simply by mixing reactants. The use of a solvent for the reactants is not necessary. The reaction is exothermic in nature and it is initiated, and brought to substantial completion, without the application of heat from external source. In carrying out the process, it is preferred to use stoichiometrically equivalent quantities of the reactants, that is, a ratio of about one mole of α-hydroxy-β,β-dimethyl-γ-butyrolactone for each mole of di(3-aminopropyl) ether used. After the exothermic reaction ceases, this being evidenced by a decline in the temture of the reaction mixture, it is preferred to heat the reaction mixture for a short period of time, for example, from about 15 minutes to about 30 minutes, at a temperature of from about 40° to about 80° C. Such a heating step will insure that the reaction has reached completion and that the desired ether has been produced.

The novel ether of this invention is obtained by the foregoing procedure in quantitative yields in the form of a colorless viscous mass. This ether is readily soluble in water as well as in conventional organic solvents, such as, alcohols, for example, ethyl alcohol; ethers, for example, diethyl ether; and ketones, for example, acetone.

As indicated heretofore, the novel 3,3'-bis(α,γ-dihydroxy-β,β-dimethylbutyrylamino)-dipropyl ether of this invention is extremely well suited for use as an active component of cosmetic preparations. Thus, the novel ether can be made up into cosmetic preparations, for example, hair washes, hair oils, salves and compositions for the care of the skin, in the usual manner, using conventional cosmetic excipients, such as, aqueous alcohol, paraffin oil, fatty substances, etc. Perfuming agents and other conventional cosmetic adjuvants can also be incorporated into the preparations. The quantity of the novel ether present in such compositions can, of course, vary within rather wide limits. As a general rule, however, it will be advantageous to have present in the compositions at least about 0.1 percent by weight of the 3,3'-bis(α,γ-dihydroxy-β,β-dimethylbutyrylamino) - dipropyl ether. Obviously, greater quantities of the ether can be present in the composition, if desired, and, at times, the presence of such greater quantities will be preferred.

For a fuller understanding of the nature and objects of this invention, reference may be had to the following examples which are given merely as further illustrations of the invention and are not to be construed in a limiting sense.

Example 1

In this example, 13.2 grams of di(3-aminopropyl) ether were mixed with 26.0 grams of D(—)-α-hydroxy-β,β-dimethyl-γ-butyrolactone at room temperature, with stirring. The reaction commenced immediately, with a temperature of about 80° C. being developed without the application of heat from an external source. The reaction mixture was stirred continuously until the temperature thereof started to decline. When this occurred, the reaction mixture was heated for a period of about thirty minutes at a temperature of about 80° C.

There was obtained by this procedure, D(+)-3,3'-bis(α,γ-dihydroxy-β,β - dimethylbutyrylamino) - dipropyl ether, in a quantitative yield, in the form of a colorless highly viscous mass. The compound was readily soluble in water and it was similarly soluble in customary organic solvents. In water, the compound had pH of 8.0 to 8.5; $[\alpha]_D^{20} = +30.01°$ (c.=2.9788 in water).

The di-(3-aminopropyl) ether which was used for the starting material in this example was obtained in a known manner by the reaction of ethylene cyanhydrin and acrylonitrile, with subsequent hydrogenation.

Example 2

In this example, 1.0 part by weight of D(+)-3,3'-bis(α,γ-dihydroxy-β,β - dimethylbutyrylamino) - dipropyl ether, prepared as described in Example 1, was dissolved in 100 grams of 50% aqueous ethyl alcohol, with moderate heating. The mixture was colored and perfumed, as needed.

After cooling, the mixture was made up to 1000 parts by volume using a 50% alcohol/water (1:1) mixture. The preparation, thus obtained, was found to be extremely well suited for use as a tonic for the treatment of the scalp and the hair.

The procedure, described in the preceding paragraphs of this example, was repeated using 2.0, 3.0, 4.0 and 5.0 parts by weight of the D(+)-3,3'-bis(α,γ-dihydroxy-β,β-dimethylbutyrylamino)-dipropyl ether in lieu of the 1.0 part by weight of that ether used originally. Moreover, the procedure of this example was repeated using 1.0, 2.0, 3.0, 4.0 and 5.0 parts by weight of the ether dissolved in 50% aqueous isopropyl alcohol. In each instance, there was obtained a preparation well suited for use in the treatment of the scalp and hair.

Example 3

In this example, 1.0 gram of D(+)-3,3'-bis(α,γ-dihydroxy-β,β-dimethylbutyrylamino)-dipropyl ether, produced as described in Example 1, was dissolved in 100 grams of paraffin oil, with moderate heating. The solution thus obtained was colored and perfumed, as needed. Subsequently, the solution is made up to 1000 grams with paraffin oil.

There was thus obtained a preparation which was found to be well suited for use as a hair oil. Thus preparation was useful in the treatment of dry scalp, dandruff and dry hair. The procedure, described in the preceding paragraphs of this example, was repeated using 2.0, 3.0, 4.0 and 5.0 grams of D(+)-3,3'-bis(α,γ-dihydroxy-β,β-dimethylbutyrylamino)-dipropyl ether in lieu of the 1.0 gram thereof used originally.

In each instance, there was obtained a hair oil preparation which was found to be well suited for use in the treatment of dry scalp, dry dandruff and brittle hair.

*Example 4*

In this example, 5.0 grams of glyceryl monostearate, 1.0 gram of cetyl alcohol, 1.0 grams of lanolin, 10.0 grams of isopropyl-myristal, 10.0 grams of acetostearate, 5.0 grams of beeswax and 20.0 grams of Hostaphat KL–340 (ethoxylated mattey alcohol-phopshoric acid ester) were admixed and heated to a temperature of about 60° C. Subsequently, there was added to the molten mixture, thus obtained, 5.0 grams of D(+)-3,3'-bis($\alpha,\gamma$-dihydroxy-$\beta,\beta$-dimethylbutyrylamino) - dipropyl ether, produced as described in Example 1. Thereafter, at a temperature of 50° C., 918 grams of water were slowly added to, and by stirring, worked in, the mixture. The emulsion which was obtained was perfumed and colored, as needed.

The prepartion which was obtained in this example was hand lotion, especially well suited for use in the treatment of rough, dry and cracked skin.

*Example 5*

In this example, there was admixed 30.0 grams of glycryl monostearate, 20.0 grams of stearyl alcohol, 20.0 grams of cetyl alcohol, 20.0 grams of isopropyl-myristal, 10.0 grams of lanolin and 30.0 grams of Hostaphat KL–340 (ethoxylated fatty alcoholphosphoric acid ester. This mixture was heated to a temperature of about 60° C. to form a molten mass. Thereafter, to this melt, there was slowly added a solution of 10.0 grams of D(+)-3,3'-bis($\alpha,\gamma$-dihydroxy-$\beta,\beta$ - dimethylbutyrylamino) - dipropyl ether, produced as described in Example 1, dissolved in 860 grams of water. During such addition, which was carried out with continuous stirring, the mixture was maintained at a temperature of about 50° C. The preparation which was obtained was in the form of a lotion, suitable for use in the treatment of dry facial skin.

*Example 6*

In this example, there was prepared, first, a salve containing 4 parts by weight of cetyl alcohol, 10 parts by weight of lanolin and 86 parts by weight of Vaseline. Thereafter, 75 grams of this salve were heated to a temperature of about 40° C. and, at that temperature, there was added thereto and emulsified therein a mixture containing 5.0 grams of D(+)-3,3'-bis($\alpha,\gamma$-dihydroxy-$\beta,\beta$-dimethylbutyrylamino)-dipropyl ether, produced as described in Example 1, and 20 grams of water. The emulsion thus produced was found to be suitable for use in the treatment of rough, dry and cracked skin.

*Example 7*

In this example, 5 grams of D(+)-3,3'-bis($\alpha,\gamma$-dihydroxy-$\beta,\beta$-dimethylbutyrylamino)-dipropyl ether, produced as described in Example 1, was added to 45 grams of water. There was added to, and dissolved in, this mixture, at a temperature of 70° C., 10.0 grams of polyoxyethylene sorbitan monostearate. Concurrently therewith, 30 grams of hydrogenated peanut oil and 10 grams of glycerine were melted together and heated to a temperature of 70° C. The separate mixtures were admixed at a temperature of 70° C., and an emulsion formed. Upon cooling, there was obtained a product having salve-like consistency. This product was found to be well suited for use in the treatment of rough, dry and cracked skin.

We claim:

1. 3,3' - bis($\alpha,\gamma$ - dihydroxy - $\beta,\beta$ - dimethylbutyrylamino)-dipropyl ether.

2. D(+) - 3,3' - bis($\alpha,\gamma$ - dihydroxy - $\beta,\beta$ - dimethylbutyrylamino)-dipropyl ether.

References Cited

UNITED STATES PATENTS

| | | | |
|---|---|---|---|
| 2,413,077 | 12/1946 | Schrider | 260—561 |
| 3,025,323 | 3/1962 | Rose et al. | 250—561 |

ALEX MAZEL, *Primary Examiner.*

J. NARCAVAGE, *Assistant Examiner.*